United States Patent [19]
Pla et al.

[11] Patent Number: 5,423,658
[45] Date of Patent: * Jun. 13, 1995

[54] ACTIVE NOISE CONTROL USING NOISE SOURCE HAVING ADAPTIVE RESONANT FREQUENCY TUNING THROUGH VARIABLE RING LOADING

[75] Inventors: Frederic G. Pla, Schenectady; Harindra Rajiyah, Clifton Park; Anthony A. Renshaw, Albany; Robert A. Hedeen, Clifton Park, all of N.Y.

[73] Assignee: General Electric Company, Schenectady, N.Y.

[*] Notice: The portion of the term of this patent subsequent to Jan. 17, 2012 has been disclaimed.

[21] Appl. No.: 143,603

[22] Filed: Nov. 1, 1993

[51] Int. Cl.$^6$ .............................................. F01D 25/00
[52] U.S. Cl. ..................................... 415/118; 415/119; 181/206; 244/1 N; 381/71
[58] Field of Search ................. 415/118, 119; 181/206; 381/64, 71; 244/1 N; 340/388.1, 388.3

[56] References Cited

U.S. PATENT DOCUMENTS

| | | | |
|---|---|---|---|
| 3,693,749 | 9/1972 | Motsinger et al. | 181/206 |
| 3,936,606 | 2/1976 | Wanke | 415/119 |
| 3,991,849 | 11/1976 | Green et al. | 415/119 |
| 4,044,203 | 8/1977 | Swinbanks . | |
| 4,199,295 | 4/1980 | Raffy et al. | 415/119 |
| 4,255,083 | 3/1981 | Andre et al. | 415/119 |
| 4,689,821 | 8/1987 | Salikuddin et al. . | |
| 4,700,177 | 10/1987 | Nakashima et al. . | |
| 4,715,559 | 12/1987 | Fuller . | |
| 4,947,356 | 8/1990 | Elliott et al. . | |
| 4,947,434 | 8/1990 | Ito . | |
| 4,967,550 | 11/1990 | Acton et al. | 60/39.29 |
| 5,031,222 | 7/1991 | Takaya . | |
| 5,060,471 | 10/1991 | Torkelson | 415/119 |

FOREIGN PATENT DOCUMENTS

| | | | |
|---|---|---|---|
| 58-7999 | 1/1983 | Japan . | |
| 159406 | 6/1989 | Japan | 415/119 |
| 124598 | 5/1990 | Japan | 340/388.1 |
| 47200 | 2/1992 | Japan | 415/119 |

OTHER PUBLICATIONS

Elliott et al., "A Multiple Error LMS Algorithm and Its Application to the Active Control of Sound and Vibration," IEEE Transactions on Acoustics, Speech, and Signal Processing, vol. ASSP-35, No. 10, Oct. 1987, pp. 1423–1434.

Primary Examiner—Edward K. Look
Assistant Examiner—James A. Larson
Attorney, Agent, or Firm—Patrick R. Scanlon; Paul R. Webb, II

[57] ABSTRACT

A noise source for an aircraft engine active noise cancellation system in which the resonant frequency of noise radiating structure is tuned to permit noise cancellation over a wide range of frequencies. The resonant frequency of the noise radiating structure is tuned by a plurality of drivers arranged to contact the noise radiating structure. Excitation of the drivers causes expansion or contraction of the drivers, thereby varying the edge loading applied to the noise radiating structure. The drivers are actuated by a controller which receives input of a feedback signal proportional to displacement of the noise radiating element and a signal corresponding to the blade passage frequency of the engine's fan. In response, the controller determines a control signal which is sent to the drivers, causing them to expand or contract. The noise radiating structure may be either the outer shroud of the engine or a ring mounted flush with an inner wall of the shroud or disposed in the interior of the shroud.

17 Claims, 4 Drawing Sheets

ACTIVE NOISE CONTROL USING NOISE SOURCE HAVING ADAPTIVE RESONANT FREQUENCY TUNING THROUGH VARIABLE RING LOADING

The U.S. Government has rights in this invention as provided for by the terms of contract No. NAS3-26617 awarded by the National Aeronautics and Space Administration (NASA).

CROSS REFERENCE TO RELATED APPLICATIONS

This application is related to the following copending applications: "Active Noise Control Using Noise Source Having Adaptive Resonant Frequency Tuning Through Stiffness Variation," Ser. No. 08/143,602, "Active Noise Control Using Noise Source Having Adaptive Resonant Frequency Tuning Through Stress Variation," Ser. No. 08/143,605, and "Active Noise Control Using Noise Source Having Adaptive Resonant Frequency Tuning Through Variable Panel Loading," Ser. No. 08/143,604. All of these related copending applications are filed concurrently herewith and assigned to the same assignee as the present invention.

BACKGROUND OF THE INVENTION

This invention relates generally to reducing aircraft engine noise with a cancellation noise field which is generated by vibrational inputs to noise radiating structures and more particularly concerns changing the boundary conditions of the noise radiating structures to produce adaptive tuning of the resonant frequency of the structures.

Excessive noise has always been a problem confronting the aviation industry. Noise from discrete tones generated by the fans and turbines of modern aircraft engines is a major source of the noise problems. This is particularly true in communities surrounding airports which are subjected to the noise of take off and landing operations. Lately, fan and turbine noise has become an even larger issue due to the louder fan noise of the large-thrust high bypass engines and the increased enactment and enforcement of strict community anti-noise regulations.

Turbine and fan noise has been addressed for many years by employing passive techniques such as noise absorbing liners; tuned resonators, or a combination thereof. Such devices are usually mounted at the inlet and outlet of the engine to reduce noise radiated from the engine. Some disadvantages associated with these passive techniques include added weight and decreased thrust. Also, absorbent liners are generally ineffective against the long wavelengths of low frequency noise, and tuned resonators are only useful at the frequency to which they are tuned.

One possible active approach to fan and turbine noise control is to cancel the noise using secondary or cancelling noise fields generated with acoustical inputs. The cancelling noise field, which is of equal amplitude but 180° out-of-phase with the primary field, destructively interferes with and cancels the primary field. However, standard acoustical inputs, such as loudspeakers, are expensive, fragile, heavy and require a relatively large amount of power. An alternative to acoustical inputs is disclosed in the copending application entitled "Active Control of Aircraft Engine Noise Using Vibrational Inputs," Ser. No. 08/051,810, filed Apr. 21, 1993 which is a File Wrapper Continuation of application Ser. No. 07/787,471, filed Nov. 4, 1991 and assigned to the same assignee as the present invention. Application Ser. No. 08/051,810 discloses using piezoceramic actuators instead of acoustical inputs to generate the cancelling noise field. The actuators are mounted either directly to an inner surface of an aircraft engine or to noise radiating elements resiliently mounted to the inner surface. When excited, the actuators produce vibrations in their supporting structure (the noise radiating elements or the engine itself) which "shake" the structure so that it generates the cancelling noise field.

The supporting structure which is shaken by the piezoceramic actuators may be made of low-damping materials because the peak vibratory response at resonance of elements fabricated with low-damping materials is very high and produces a correspondingly high acoustic output which is needed to cancel the engine noise. However, the off-resonance vibratory response of elements fabricated with low-damping materials is very low and does not result in an acoustic output sufficient to cancel engine noise. Thus, such piezoceramic-actuated noise cancellation is only effective over a narrow frequency range. Cancellation of aircraft engine noise is often required over a wider range of frequencies.

Accordingly, there is a need for an active noise cancellation system which is effective over a wide frequency range.

SUMMARY OF THE INVENTION

The above-mentioned needs are met by the present invention in which the cancelling sound field is generated using noise radiating structure which is vibrated by actuators mounted thereon. To accomplish noise cancellation over a wide range of frequencies, the structural resonant frequency of the noise radiating structure is tuned by adaptively changing their boundary conditions. Changing the structure's boundary conditions (such as torsional or linear stiffness, or compressive or tensile loading) will alter its resonant frequency.

Specifically, the present invention provides an active noise cancellation system comprising one or more actuators disposed on noise radiating structure in an aircraft engine. A plurality of drivers are arranged to contact the noise radiating structure. Excitation of the drivers causes expansion or contraction of the drivers, thereby varying the edge force applied to the noise radiating structure. The drivers are actuated by a controller which receives input of a feedback signal proportional to displacement of the noise radiating element and a signal corresponding to the blade passage frequency of the engine's fan. In response, the controller determines a control signal which is sent to the drivers, causing them to expand or contract. The noise radiating structure may be either the outer shroud of the engine or a ring mounted flush with an inner wall of the shroud or disposed in the interior of the shroud.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
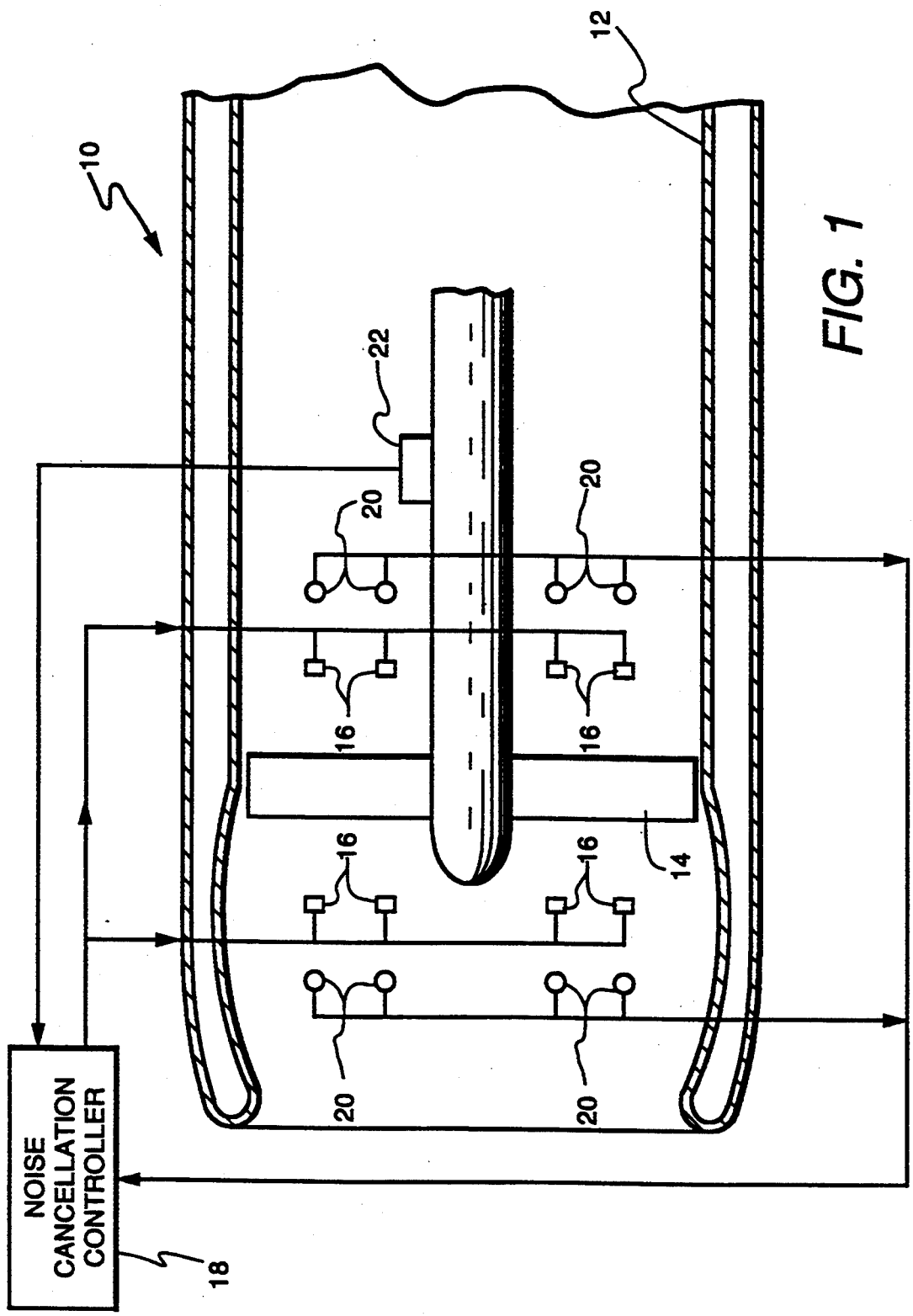
FIG. 1 shows a schematic, cross-sectional view of an aircraft engine incorporating the active noise cancellation system of the present invention.

Referring to the drawings wherein identical reference numerals denote the same elements throughout the various views, FIG. 1 schematically shows the active noise cancellation system of the present invention as implemented in an aircraft engine 10. The engine 10, which in itself does not form a part of the present invention, can be any typical turbine- or fan-driven aircraft engine. The engine 10 includes an outer shroud 12 and a fan 14. For the sake of clarity, the other parts of the engine 10 are not shown.

In the present invention, noise sources 16 are provided to generate a secondary or cancelling noise field which destructively interferes with the primary noise field of the engine 10. FIG. 1 schematically shows a plurality of noise sources 16 mounted in the inner surface of the engine shroud 12. The size of the noise sources 16 depends on the acoustic power required to produce the secondary sound field. The number and placement of the noise sources 16 depends mainly on the modal order of the primary noise field to be cancelled. Ideally, a number of noise sources 16 will be distributed around the periphery of the engine shroud 12 in a cross-sectional plane to define a "ring source." One or more ring sources may be located both upstream and downstream of the fan 14. A plurality of ring sources, each designed for a different noise bandwidth, can be used for cancellation of multiple tones.

The noise sources 16 are controlled by a noise cancellation controller 18 connected to each of the noise sources. The controller 18 receives input from a plurality of noise transducers 20 and a tachometer 22. The transducers 20 sense noise generated by the engine 10 and produce an error signal corresponding to the level of noise sensed. The noise transducers 20 can be microphones, piezoelectric transducers or any other type of device capable of sensing noise and producing an electrical signal output thereof. The transducers 20 are generally located near to wherever noise is believed to emanate from. Preferably, an array of noise transducers 20 is located upstream of the fan 14 and another array is located downstream of the fan 14, as shown in FIG. 1. The tachometer 22 inputs the blade passage frequency of the fan 14 into the controller 18. In response to the inputs from the noise transducers 20 and the tachometer 22, the controller 18 determines an appropriate control signal which is sent to each of the noise sources 16. The control signal causes the noise sources 16 to vibrate with the frequency and amplitude needed to create the proper secondary noise field for minimizing total noise.

The controller 18 can be implemented using one of a variety of standard control schemes known in the art. One preferred scheme uses a multi-input, multi-output (MI/MO) adaptive filtering approach based on the MI/MO Filtered-X LMS algorithm. Such an algorithm is described in the article "A Multiple Error LMS Algorithm and its Application to the Active Control of Sound and Vibration," IEEE Transactions on Acoustic Speech and Signal Processing, Vol. ASSP-35, No. 10, October, 1987, by Stephen Elliott et al. In such a control scheme, the control signals which are sent to the noise sources 16 are adjusted in real time to minimize noise at the noise transducers 20. The controller 18 can react nearly instantly to any change in the RPM of the fan 14. Moreover, due to its adaptive nature, the controller 18 is self-configuring and can self-adapt to changes in the system such as noise source or transducer failure.

Figure 2:
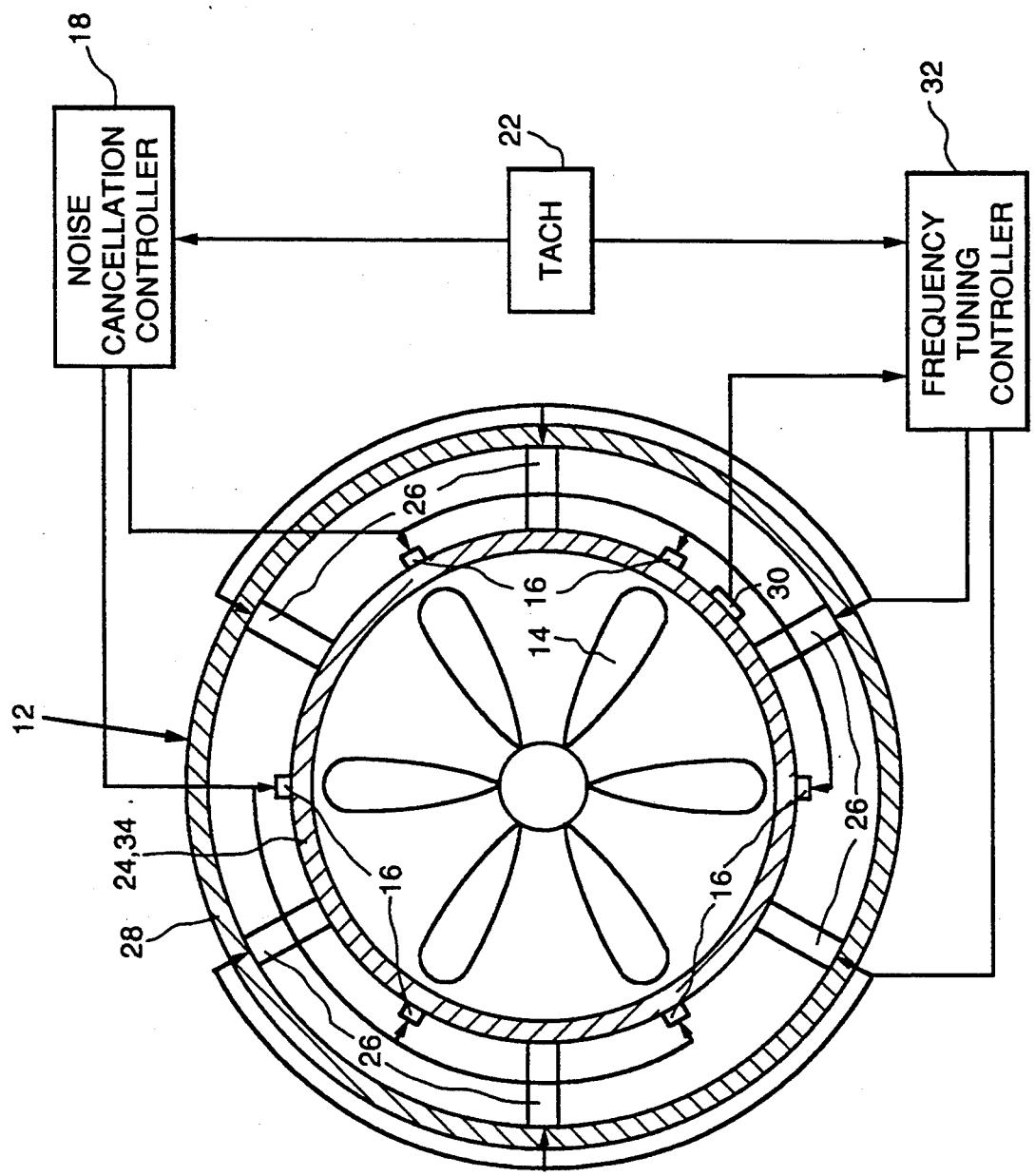
FIG. 2 is a cross-sectional end view showing a first embodiment of the noise source of the present invention in detail.

Turning to FIG. 2, a first preferred configuration of the present invention is shown in detail. As seen in FIG. 2, a number of the noise sources 16 are distributed evenly about the interior surface of the inner wall 24 of the shroud 12. Although six noise sources 16 are shown, this is only for purposes of illustration. More or less than six noise sources can be employed depending on the requirements of each particular application. Each noise source 16 is preferably a thin sheet actuator of piezoceramic, electrostrictive or magnetostrictive material disposed flat on the inner wall 24. The thin sheet exerts an oscillating force in the plane of the inner wall 24 when excited by the control signal sent from the controller 18. Structure-borne noise is then generated when in-plane vibrations change the shape of the inner wall 24 and produce bending motions. The highest, and thus most effective, acoustic output is achieved when the inner wall 24 is vibrated at one of its natural resonant frequencies.

In the present invention, the resonant frequency of the inner wall 24 is adaptively tuned by changing its boundary conditions, thereby providing effective noise cancellation over a wider frequency range. To this end, a number of drivers 26 are disposed between the inner wall 24 and the outer wall 28 of the shroud 12. Each driver 26 preferably includes a strut and an actuator supported by the strut. The actuators can comprise piezoceramic, electrostrictive or magnetostrictive materials or can even comprise an electromechanical device. Although six drivers 26 are shown, the present invention need not be limited to this particular number. Excitation of the drivers 26 with a DC voltage will cause them to expand or contract, depending on the nature of the applied voltage. The opposing ends of the drivers 26 contact the inner wall 24 and the outer wall 28, respectively, so that expansion or contraction of the drivers 26 will change the tensile or compressive edge loading on the inner wall 24, thereby changing its resonant frequency.

A feedback sensor 30 is optionally disposed on the inner wall 24. The feedback sensor 30 can be any type of device which produces a signal that is proportional to the displacement (as well as the velocity or acceleration) of the inner wall 24. Suitable devices include an accelerometer, a strain gauge or a patch of piezoceramic material. The feedback signal produced by the feedback sensor 30 is fed to a frequency tuning controller 32. The tuning controller 32 also receives input of the blade passage frequency from the tachometer 22. In response to these inputs, the controller 32 determines an appropriate control signal (in the form of a DC voltage) which is sent to the drivers 26. The tuning controller 32 is implemented using a control scheme in which the gain is adjusted in accordance with the inputted blade passage frequency.

Instead of being directly mounted to the inner wall 24, the noise sources 16 can be indirectly mounted via a noise radiating element 34 mounted in the inner wall 24. The noise sources 16 are disposed on the noise radiating element 34 and thus shake the noise radiating element 34 to generate the secondary noise field. The noise radiating element 34 is a relatively thin, cylindrical ring of a lightly damped material such as aluminum disposed in the inner wall 24 so as to be flush with its exterior surface. This arrangement assures that the noise controlling structure does not interfere with engine performance. The noise radiating element 34 is preferably attached to the inner wall 24 by resilient mounting means (not shown). The resilient mounting means allow the noise radiating element 34 to expand and contract and prevent propagation of the noise generating vibrations from the noise sources 16 to the critical parts of the engine 10. In this case, the drivers 26 will contact the noise radiating element 34 so that expansion or contraction of the drivers 26 tunes the resonant frequency of the noise radiating element 34, and the feedback sensor 30 will be disposed on the noise radiating element 34.

In operation, the tuning controller 32 applies the control signal to the drivers 26 causing the inner wall 24 (or the noise radiating element 34 where one is used) to either expand or contract, thereby changing its tensile or compressive loading. This tunes the resonant frequency of the inner wall 24 (or the noise radiating element 34) so that it tracks the blade passage frequency of the fan 14. The noise cancellation controller 18 then sends control signals to the noise sources 16 which cause the inner wall 24 (or the noise radiating element 34) to vibrate at resonance and generate a noise field which tends to cancel the primary field produced by the engine 10.

Figure 4:
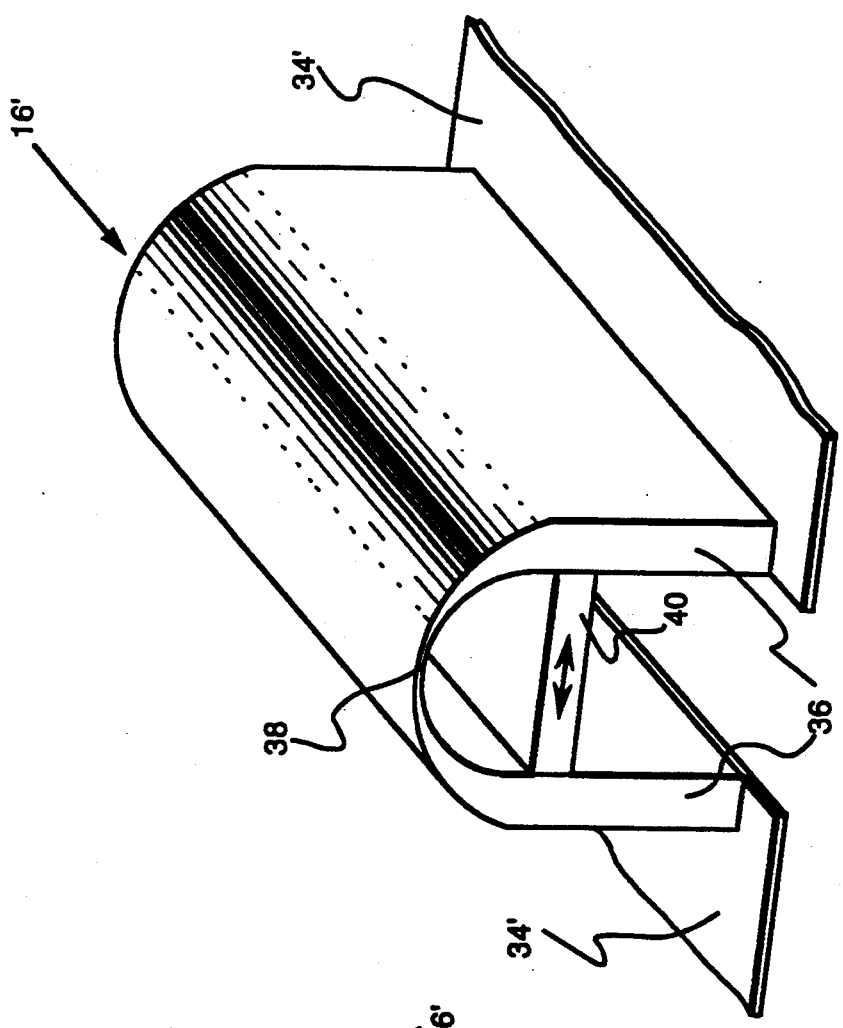
FIG. 4 is a perspective view of an alternate noise source of the present invention.
Figure 3:
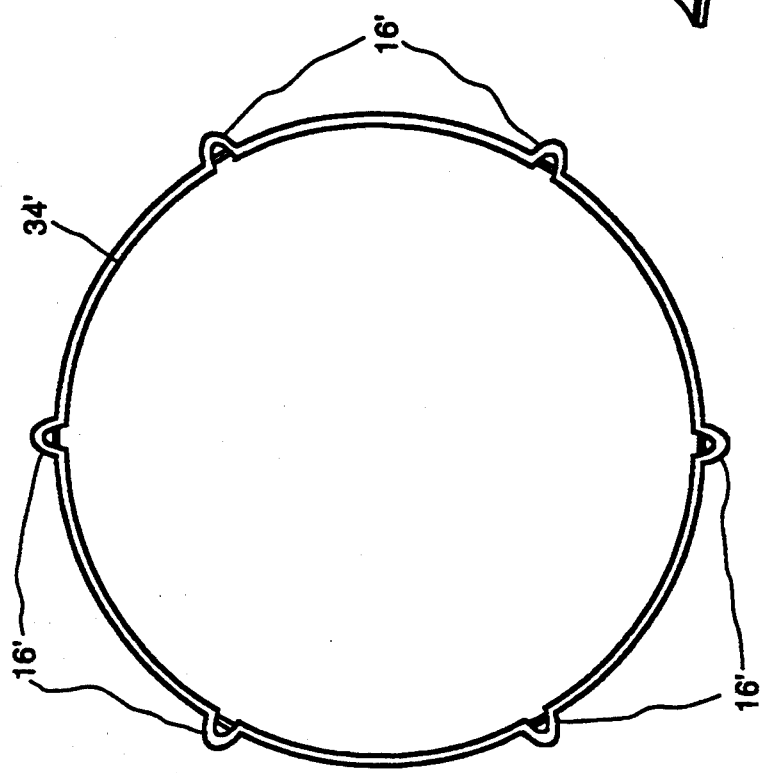
FIG. 3 shows an alternate configuration of the present invention.

An alternative noise source 16' which employs a mechanical lever arrangement instead of a thin sheet actuator is shown in FIGS. 3 and 4. This embodiment utilizes a noise radiating element 34' which comprises a number of arcuate portions connected end-to-end by a number of the alternate noise sources 16' so as to form a closed ring. Each noise source 16' comprises a pair of lever members 36 (FIG. 4). Respective ends of the lever members 36 are connected together at a flexure point 38 so that the noise source 16' forms a unitary, U-shaped assembly. The other ends of the two lever members are attached to respective arcuate portions of the noise radiating element 34'. An expandable element 40, which can comprise piezoceramic, electrostrictive, magnetostrictive or electromechanical means, is disposed between the two lever members 36. When excited, the element 40 is displaced back and forth along the lateral directions shown by the arrow, thus causing the lever members 36 to essentially pivot back and forth about the flexure point 38. Consequently, the oscillating displacements of the element 40 are amplified and transferred through the lever members 36 to the noise radiating element 34', thereby shaking the noise radiating element 34' to create the desired noise field.

Figure 5:
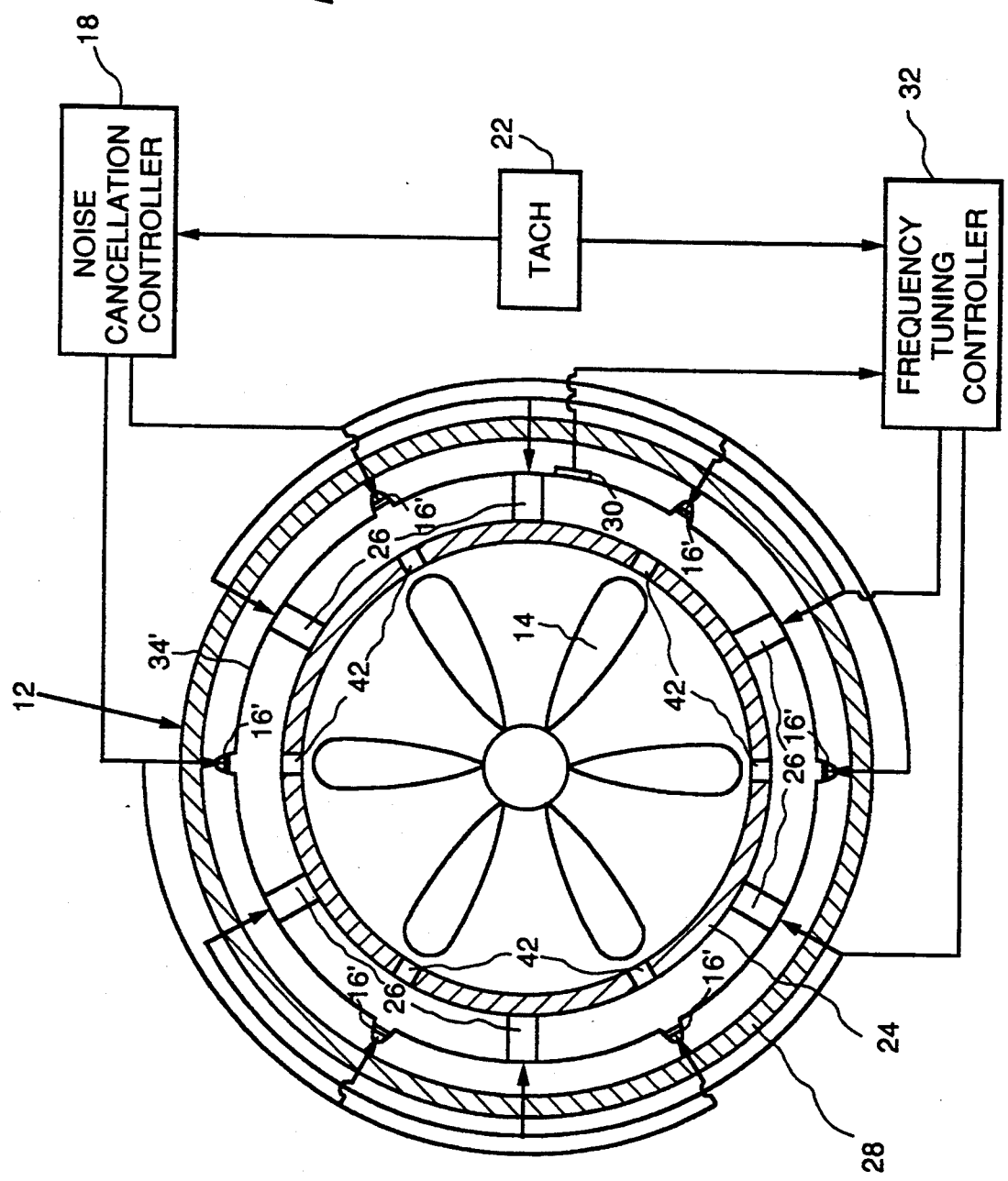
FIG. 5 is a cross-sectional end view showing a second embodiment of the noise source of the present invention in detail.

Turning to FIG. 5, another embodiment of the present invention is shown. This embodiment uses a noise radiating element 34' having noise sources 16', but instead of being an integral part of the inner shroud wall 24, the noise radiating element 34' is disposed in the hollow interior of the shroud 12. (A noise radiating element 34 using thin sheet noise sources 16 is also applicable to this embodiment.) The noise radiating element 34' is supported in the interior of the shroud 12 by a number of drivers 26 disposed between the noise radiating element 34' and inner wall 24. Excitation of the drivers 26 with a DC voltage will cause them to expand or contract, depending on the nature of the applied voltage. The opposing ends of the drivers 26 contact the inner wall 24 and the noise radiating element 34', respectively, so that expansion or contraction of the drivers 26 will change the tensile or compressive loading on the noise radiating element 34', thereby changing its resonant frequency. A number of sound ports 42 are formed in the inner shroud wall 24 to permit the cancelling noise field to be transmitted into the engine interior. The sound ports 42 are preferably covered with a mesh or similar structure to prevent ingress of foreign materials.

The remaining elements of this embodiment are the same as those in the previously-described embodiments and function in the same manner. Thus, the feedback sensor 30 is disposed on the noise radiating element 34' and sends a feedback signal to the tuning controller 32. In response to the feedback signal and the blade passage frequency input from the tachometer 22, the controller 32 determines appropriate control signals (in the form of a DC voltage) which are sent to the drivers 26. The control signals cause appropriate expansion or contraction of the drivers 26, thereby changing the tensile or compressive stresses in the noise radiating element 34'. This tunes the resonant frequency of the noise radiating element 34' so that it tracks the blade passage frequency of the fan 14. The noise cancellation controller 18 then sends control signals to the noise sources 16' which cause the noise radiating element 34' to vibrate at resonance and generate a noise field which tends to cancel the primary field produced by the engine 10.

The foregoing has described an active noise control system in which the cancelling noise is generated through vibrational inputs to structure which has adaptively changing boundary conditions to allow adaptive tuning of the resonant frequency of the structure for maximum efficiency. Although the present invention has been described primarily for use with an aircraft engine, the invention can be used in almost any device where high-order acoustic modes propagating down a waveguide are to be eliminated. Examples of such devices include heat, ventilation, and air conditioning (HVAC) systems and turbine devices.

While specific embodiments of the present invention have been described, it will be apparent to those skilled in the art that various modifications thereto can be made without departing from the spirit and scope of the invention as defined in the appended claims.

What is claimed is:

1. An apparatus for minimizing noise emanating from an aircraft engine which has an outer shroud and a fan, said apparatus comprising:

means for inducing vibrations coupled to said outer shroud;

means for applying a variable force to said outer shroud;

means for producing a blade passage frequency signal corresponding to the blade passage frequency of said fan;

a frequency tuning controller having an input connected to said means for producing a blade passage frequency signal and an output connected to said means for applying a variable force, said frequency tuning controller being responsive to said blade passage frequency signal to determine a frequency control signal which is sent to said means for applying a variable force, said frequency control signal causing said means for applying a variable force to vary the force applied to said outer shroud;

means for sensing noise generated by said engine, said means for sensing noise producing an error signal corresponding to the level of noise sensed; and a noise cancellation controller having an input connected to said means for sensing noise, another input connected to said means for producing a blade passage frequency signal, and an output connected to said means for inducing vibrations, said noise cancellation controller being responsive to said error signal and said blade passage frequency signal to determine a noise control signal which is sent to said means for inducing vibrations, said noise control signal causing said means for inducing vibrations to vibrate said outer shroud and generate a noise field which minimizes the total noise emanating from said engine.

2. The apparatus of claim 1 further comprising a sensor disposed on said outer shroud, said sensor producing a feedback signal proportional to displacement of said outer shroud, said frequency tuning controller having another input connected to said sensor.

3. The apparatus of claim 1 wherein said means for inducing vibrations comprises a plurality of actuators mounted on an inner wall of said outer shroud.

4. The apparatus of claim 1 wherein said means for applying a variable force comprises a plurality of drivers arranged to contact an inner wall of said outer shroud.

5. The apparatus of claim 4 wherein said outer shroud has a hollow interior, and said plurality of drivers are disposed in said hollow interior.

6. An apparatus for minimizing noise emanating from an aircraft engine which has an outer shroud and a fan, said apparatus comprising:

a noise radiating element coupled to said outer shroud;

means for inducing vibrations coupled to said noise radiating element;

means for applying a variable force to said noise radiating element;

means for producing a blade passage frequency signal corresponding to the blade passage frequency of said fan;

a frequency tuning controller having an input connected to said means for producing a blade passage frequency signal and an output connected to said means for applying a variable force, said frequency tuning controller being responsive to said blade passage frequency signal to determine a frequency control signal which is sent to said means for applying a variable force, said frequency control signal causing said means for applying a variable force to vary the force applied to said noise radiating element;

means for sensing noise generated by said engine, said means for sensing noise producing an error signal corresponding to the level of noise sensed; and a noise cancellation controller having an input connected to said means for sensing noise, another input connected to said means for producing a blade passage frequency signal, and an output connected to said means for inducing vibrations, said noise cancellation controller being responsive to said error signal and said blade passage frequency signal to determine a noise control signal which is sent to said means for inducing vibrations, said noise control signal causing said means for inducing vibrations to vibrate said noise radiating element and generate a noise field which minimizes the total noise emanating from said engine.

7. The apparatus of claim 6 further comprising a sensor disposed on said noise radiating element, said sensor producing a feedback signal proportional to displacement of said noise radiating element, said frequency tuning controller having another input connected to said sensor.

8. The apparatus of claim 6 wherein said means for inducing vibrations comprises a plurality of actuators mounted on said noise radiating element.

9. The apparatus of claim 6 wherein said noise radiating element comprises a ring mounted flush with an inner wall of said outer shroud.

10. The apparatus of claim 6 wherein said noise radiating element comprises a plurality of arcuate portions arranged in a ring.

11. The apparatus of claim 10 wherein said means for inducing vibrations comprises a plurality of actuators.

12. The apparatus of claim 11 wherein each one of said actuators comprises first and second levers and an expandable element situated between said levers, one end of said first lever being connected to one of said arcuate portions and one end of said second lever being connected to another one of said arcuate portions and the respective other ends of said first and second levers being connected together at a flexure point.

13. The apparatus of claim 12 wherein said noise radiating element is mounted flush with an inner wall of said outer shroud.

14. The apparatus of claim 12 wherein said outer shroud has a hollow interior, and said noise radiating element is disposed in said hollow interior.

15. The apparatus of claim 14 further comprising a plurality of sound ports formed in an inner wall of said outer shroud.

16. The apparatus of claim 6 wherein said means for applying a variable force comprises a plurality of drivers arranged to contact said noise radiating element.

17. The apparatus of claim 16 wherein said outer shroud has a hollow interior, and said plurality of drivers are disposed in said hollow interior.

* * * * *